United States Patent
Tambata et al.

(10) Patent No.: US 7,096,431 B2
(45) Date of Patent: Aug. 22, 2006

(54) MENU DISPLAY APPARATUS AND MENU DISPLAY METHOD

(75) Inventors: Ippei Tambata, Kanagawa (JP); Akira Shinada, Tokyo (JP); Katsuhiko Nunokawa, Kanagawa (JP); Hiroaki Okajima, Chiba (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 10/227,223

(22) Filed: Aug. 26, 2002

(65) Prior Publication Data

US 2003/0048309 A1    Mar. 13, 2003

(30) Foreign Application Priority Data

Aug. 31, 2001   (JP) .............................. 2001-262768

(51) Int. Cl.
G05D 1/00    (2006.01)
G06F 3/00    (2006.01)
G06F 3/048   (2006.01)

(52) U.S. Cl. ...................... 715/834; 715/810; 715/841; 701/1

(58) Field of Classification Search ............... 715/834; 701/36
See application file for complete search history.

(56) References Cited

U.S. PATENT DOCUMENTS 5,721,853 A * 2/1998 Smith .......................... 715/803
5,745,109 A * 4/1998 Nakano et al. .............. 715/838
6,046,671 A * 4/2000 Shimoura et al. ........... 340/439
6,211,858 B1 * 4/2001 Moon et al. ................. 715/771
6,236,398 B1 * 5/2001 Kojima et al. .............. 345/419
6,448,987 B1 * 9/2002 Easty et al. ................. 715/834
6,493,008 B1 * 12/2002 Yui ............................. 715/840
6,618,063 B1 * 9/2003 Kurtenbach ................. 715/834
6,816,079 B1 * 11/2004 Kuenzner et al. ......... 340/815.4
7,020,544 B1 * 3/2006 Shinada et al. ................ 701/1
2001/0042057 A1 * 11/2001 Ikebe et al. .................. 706/11
2003/0018665 A1 * 1/2003 Dovin et al. ................ 707/513
2004/0250217 A1 * 12/2004 Tojo et al. ................... 715/810
2005/0034081 A1 * 2/2005 Yamamoto et al. ......... 715/810
2005/0044509 A1 * 2/2005 Hunleth et al. ............. 715/834

FOREIGN PATENT DOCUMENTS

GB          2361612 A   * 10/2001

* cited by examiner

Primary Examiner—Ba Huynh
Assistant Examiner—David Phantana-angkool
(74) Attorney, Agent, or Firm—Oblon, Spivak, McClelland, Maier & Neustadt, P.C.

(57) ABSTRACT

A menu display apparatus includes a first display screen on which a plurality of first icons, each representing a selectable item, are sequentially disposed on a main circular arc; and a second display screen on which, of the plurality of first icons, the first icon selected by a user is moved and displayed and a plurality of second icons, each representing a selectable item belonging to the selected first icon, are displayed on the main circular arc. The first display screen and the second display screen are selectively displayed.

19 Claims, 14 Drawing Sheets

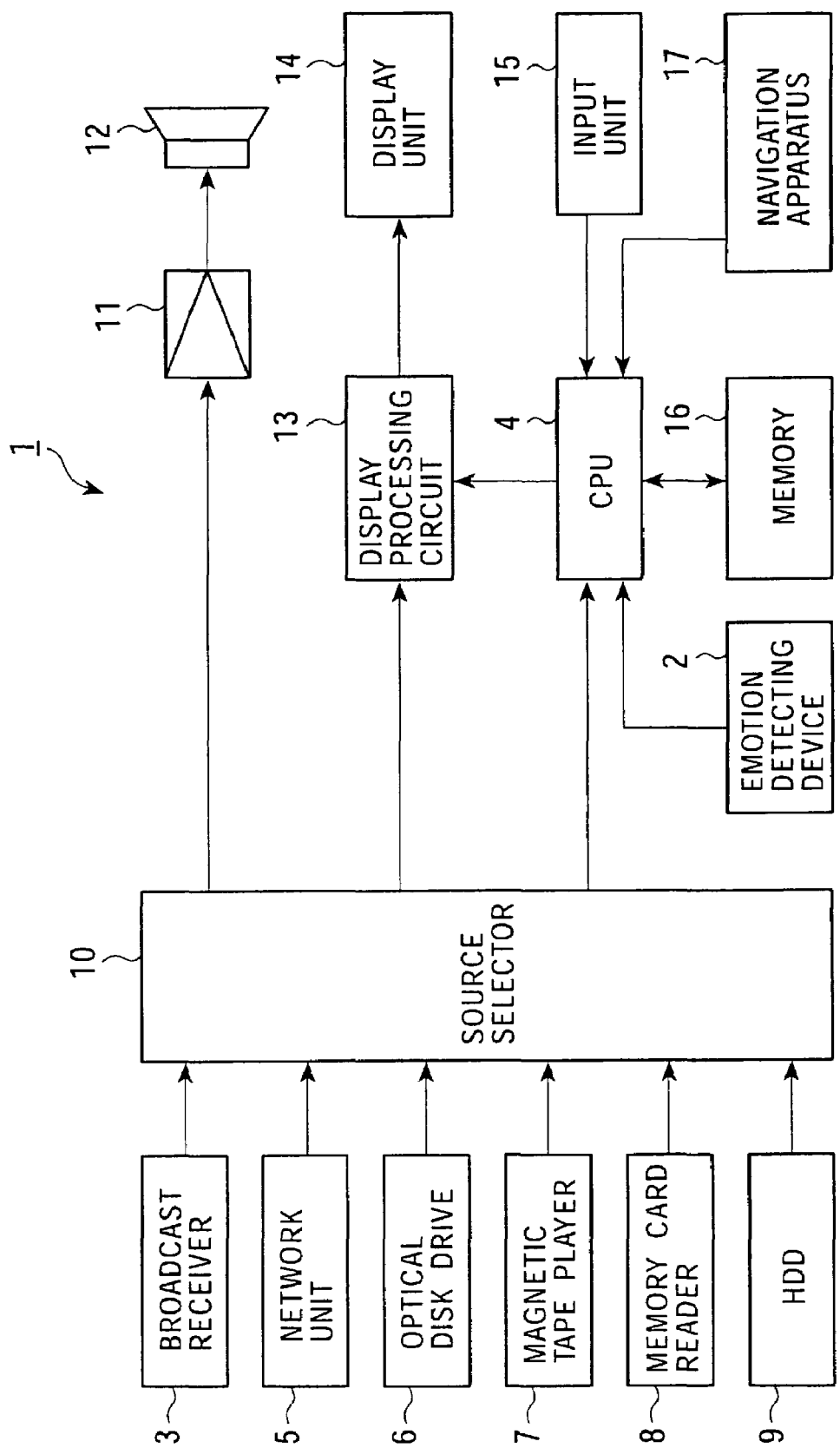

MENU DISPLAY APPARATUS AND MENU DISPLAY METHOD

BACKGROUND OF THE INVENTION

1. Field of the Invention

The present invention relates to menu display apparatuses and methods for displaying, for example, a content selecting menu or a function selecting menu in an in-vehicle apparatus. More particularly, the present invention relates to a menu display apparatus and method for allowing a user to easily and reliably select desired content by switching a display between a first display screen on which a plurality of first icons, each representing a selectable item, are sequentially disposed on a main circular arc and a second display screen on which the first icon selected by the user is moved and displayed and a plurality of second icons, each representing a selectable item belonging to the first icon selected by the user, are displayed on the main circular arc.

2. Description of the Related Art

In known personal computers, various files are managed using a hierarchical structure. By displaying various files using a hierarchical structure and by displaying pull-down menus for selecting files, a user can look at the display and select a desired file.

FIGS. 24A to 24C show examples of various files displayed using a hierarchical structure. FIG. 24A shows a displayed directory structure of an optical disk drive having a compact disk (CD) inserted therein. FIG. 24B shows a displayed directory structure of the optical disk drive having a digital versatile disk (DVD) instead of the CD inserted therein. FIG. 24C shows a displayed predetermined directory structure of a hard disk drive (HDD). In personal computers, subdirectories displayed in such a manner are sequentially opened to select a desired file.

In application programs, when a menu for opening a file is selected, a sub-window is opened by a pull-down menu, and files and folders contained in a predetermined folder are displayed in this window. A button disposed in the window is selected to switch the display to a folder contained in a higher directory. A folder displayed in this window can then be selected to switch the display to a subdirectory. In this case, the user sequentially switches the display to subdirectories to select the desired content.

Display of a content selecting menu by such a known method has practical problems.

Specifically, when selecting content, the user sequentially moves down the hierarchy in order of, for example, a music content folder, an artist name folder, and an album title folder, and the user then selects the desired content. In other words, the user sequentially narrows down the selectable music content to select the desired content.

In known display methods, it is difficult to visually represent to the user this narrowing down of selectable content. Thus, it is difficult for the user to easily and reliably select desired content.

When content is to be selected using a pull-down menu, it is necessary to display a button for switching the display. This reduces the amount of display area for displaying a content menu.

SUMMARY OF THE INVENTION

In view of the foregoing circumstances, it is an object of the present invention to provide a menu display apparatus and method for allowing a user to easily and reliably select desired content.

According to an aspect of the present invention, a menu display apparatus is provided including a first display screen on which a plurality of first icons, each representing a selectable item, are sequentially disposed on a main circular arc; and a second display screen on which, of the plurality of first icons, the first icon selected by a user is moved toward the center of the main circular arc or outside the main circular arc and is displayed and a plurality of second icons, each representing a selectable item belonging to the selected first icon, are displayed on the main circular arc. The first display screen and the second display screen are selectively displayed. When the first icon on the first display screen is selected, the display is changed from the first display screen to the second display screen. When the first icon on the second display screen is selected, the display is changed from the second display screen to the first display screen. By changing the display between the first and second display screens, it is possible to visually represent to the user narrowing down of selectable content. This allows the user to easily and reliably select desired content. It becomes unnecessary to display an additional button for changing the display, such as that required when selecting content using a pull-down menu. As a result, a content menu can be displayed in a larger display area.

According to another aspect of the present invention, a menu display method for allowing a user to easily and reliably select desired content is provided.

BRIEF DESCRIPTION OF THE DRAWINGS

FIG. 2 is a block diagram showing an in-vehicle apparatus according to the first embodiment of the present invention;

DESCRIPTION OF THE PREFERRED EMBODIMENTS

Figure 1:
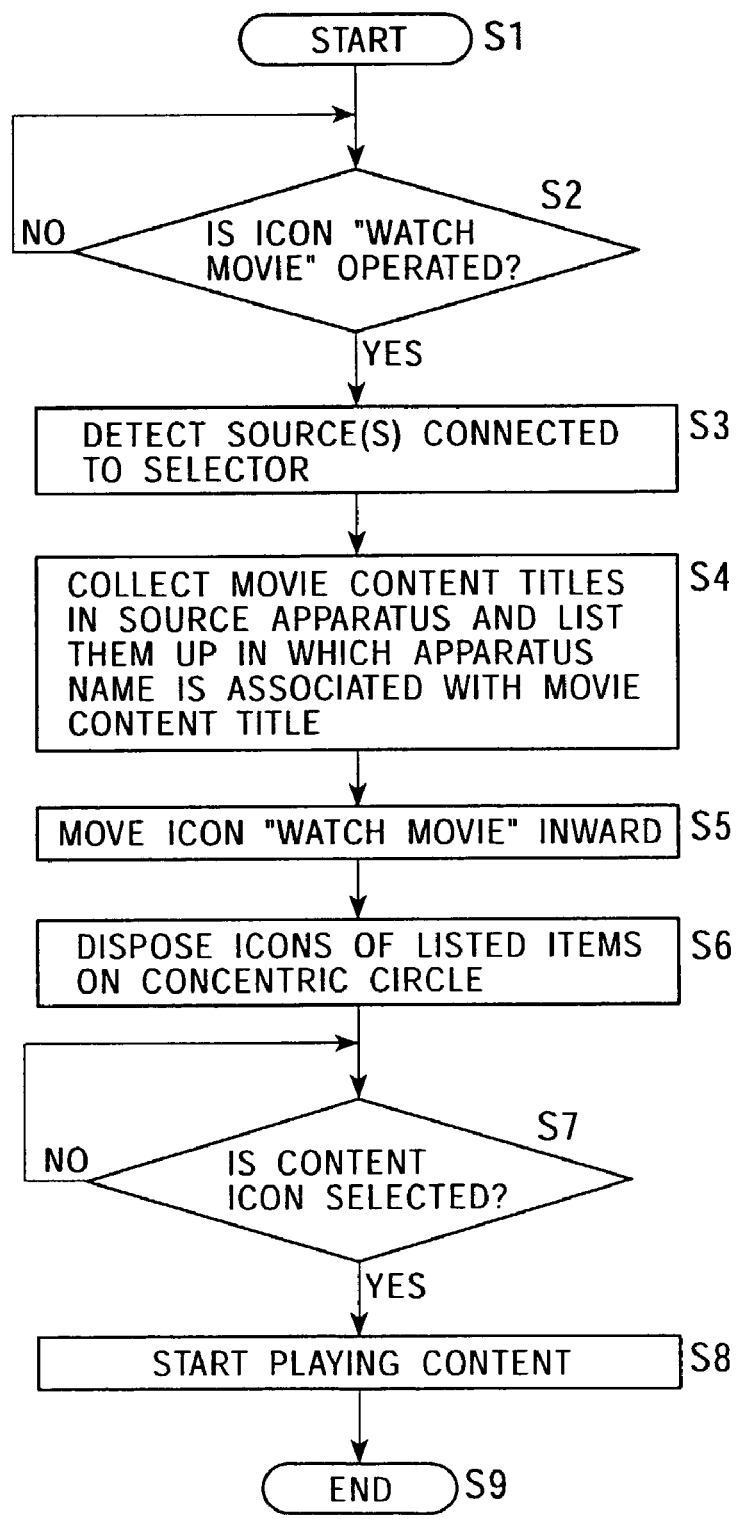
FIG. 1 is a flowchart showing a process performed by a central processing unit (CPU) according to a first embodiment of the present invention.

The present invention will be understood from the following description of the preferred embodiments with reference to the accompanying drawings.

1 First Embodiment 1-1 Configuration of First Embodiment

FIG. 2 is a block diagram showing an in-vehicle apparatus according to a first embodiment of the present invention. An in-vehicle apparatus 1 is mounted and used in a user's vehicle.

In the in-vehicle apparatus 1, an emotion detecting device 2 generates a virtual emotion, as if the vehicle had a personality, on the basis of the manner in which the vehicle is handled by a user. In other words, the emotion detecting device 2 generates virtual information from operation information obtained as a result of detecting the operation of the vehicle by the user and behavior information obtained as a result of detecting the vehicle's various behaviors. The operation information is obtained from the outputs of sensors disposed in various operation units used for driving. For example, the operation information corresponds to the opening of an acceleration pedal, which indicates an acceleration operation by the driver, the control input of a brake pedal, which indicates a braking operation, the turning on/off of a stop lamp, the operation of a parking brake, the steering angle which indicates the operation of a starring wheel, the gear shift position which indicates the operation of a gear shift lever, lights, winkers, wipers, windows, and horn. The behavior information can be obtained from various sensors disposed in the vehicle. For example, the behavior information corresponds to the engine speed, the wheel rotation speed, the vehicle speed, the longitudinal acceleration, the horizontal acceleration, the vertical acceleration, the yaw rate, the roll rate, the pitch rate, and the fuel consumption.

A broadcast receiver 3 is a receiver for receiving TV, radio, and satellite programs. Under the control of a CPU 4, the broadcast receiver 3 obtains and outputs the desired video content, music content, information content, and an electronic program guide (EPG).

A network unit 5 includes a communication unit operated under the control of the CPU 4. The network unit 5 gains access to content providing pages on the Internet and obtains the user's preferred music content, video content, or information content, and obtains and outputs a list of available content that can be presented.

An optical disk drive 6 plays an optical disk such as a CD or a DVD, which is inserted by a user, under the control of the CPU 4 and outputs music content, video content, and information content recorded therein. The optical disk drive 6 also outputs information on content recorded in the optical disk.

A magnetic tape player 7 plays a cassette tape inserted by the user and outputs music content recorded therein. The magnetic tape player 7 also outputs information on content recorded in the tape cassette.

A memory card reader 8 reads, under the control of the CPU 4, a memory card inserted by the user and outputs music content, video content, and information content stored therein. The memory card reader 8 also outputs information on content recorded in the memory card.

An HDD 9 is a built-in HDD or a removable HDD in the in-vehicle apparatus 1. Under the control of the CPU 4, the HDD 9 reads and outputs music content, video content, and information content. Also, the HDD 9 outputs information on content recorded therein.

A source selector 10 selects and outputs various content types output from the broadcast receiver 3 and the network unit 5. An amplifier 11 performs digital-to-analog conversion of audio data output from the source selector 10 and drives a speaker 12 disposed at each seat. Accordingly, the in-vehicle apparatus 1 allows passengers in individual seats to listen to sound for music content, video content, and information content obtained from various sources.

A display processing circuit 13 switches the operation under the control of the CPU 4. The display processing circuit 13 decodes and outputs image data output from the source selector 10. In response to an instruction from the CPU 4, the display processing circuit 13 sequentially updates a built-in image memory and outputs the contents of the image memory.

A display unit 14 is a liquid crystal display disposed at each seat. The display unit 14 displays image data output from the display processing circuit 13. Accordingly, the in-vehicle apparatus 1 allows passengers in the individual seats to watch moving and still images of video content obtained from various sources and various menu screens.

An input unit 15 includes a touch panel disposed on the display unit 14, a controller, and a speech recognition device. The input unit 15 sends instructions given by users in the individual seats to the CPU 4.

A navigation apparatus 17 is a car navigation apparatus using a global positioning system (GPS). Under the control of the CPU 4, the navigation apparatus 17 performs various types of car navigation processing.

The CPU 4 has a work area in a memory 16 and performs predetermined processing, thus controlling the overall operation of the in-vehicle apparatus 1. In other words, the CPU 4 controls the operation of the display processing circuit 14 on the basis of virtual emotions obtained from the emotion detecting device 2 and represents the vehicle's virtual emotions using facial expressions representing joy, anger, sadness, and pleasure. The CPU 4 provides a predetermined menu screen. In accordance with the operation performed by each user on the menu screen, each user's desired content is presented to each user.

Specifically, the CPU 4 accesses sources 3 and 5 to 9 at appropriate times for the sources 3 and 5 to 9, respectively, and detects available content that can be presented by the sources 3 and 5 to 9. More specifically, the CPU 4 periodically accesses the broadcast receiver 3, obtains the EPG, and detects available content on the basis of the EPG. Also, the CPU 4 periodically accesses the network unit 5 and detects available content that can be presented. In contrast, the CPU 4 accesses the optical disk drive 6, the magnetic tape player 7, the memory card reader 8, and the removable HDD 9 when the corresponding recording media are removed and detects available content that can be presented.

Figure 3A:
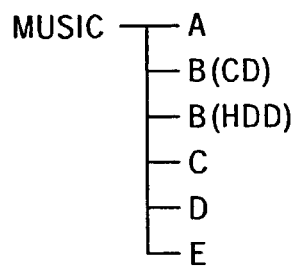
FIG. 3A shows the organization of music content.
Figure 3B:
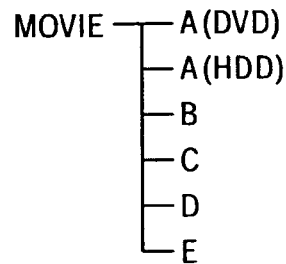
FIG. 3B shows the organization of movie content.
Figure 3C:
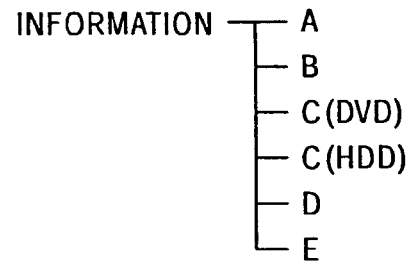
FIG. 3C shows the organization of information content.

The CPU 4 combines the detected available content, classifies the combined available content into a plurality of types, and represents the available content using a virtual directory structure. In the first embodiment, as shown in FIGS. 3A to 3C, the available content is classified into sections according to their type, namely, music, movies, and information. Each section is regarded as a folder, and a virtual directory structure is used to represent the available content. FIG. 3A shows a music folder containing available music content A to E. Of the content A to E, the content B is indicated as being recorded in both a CD inserted in the optical disk drive 6 and the HDD 9. FIG. 3B shows a movie folder containing movie content A to E. Of the content A to E, the content A is indicated as being recorded in both a DVD inserted in the optical disk drive 6 and the HDD 9. FIG. 3C shows an information folder containing information content A to E such as a tourist guide containing still images. Of the content A to E, the content C is indicated as being recorded in both a CD inserted in the optical disk drive 6 and the HDD 9.

In the first embodiment, content in different directories is combined, and the combined content is classified into sections according to type. Thus, various types of content can be selected.

Figure 4:
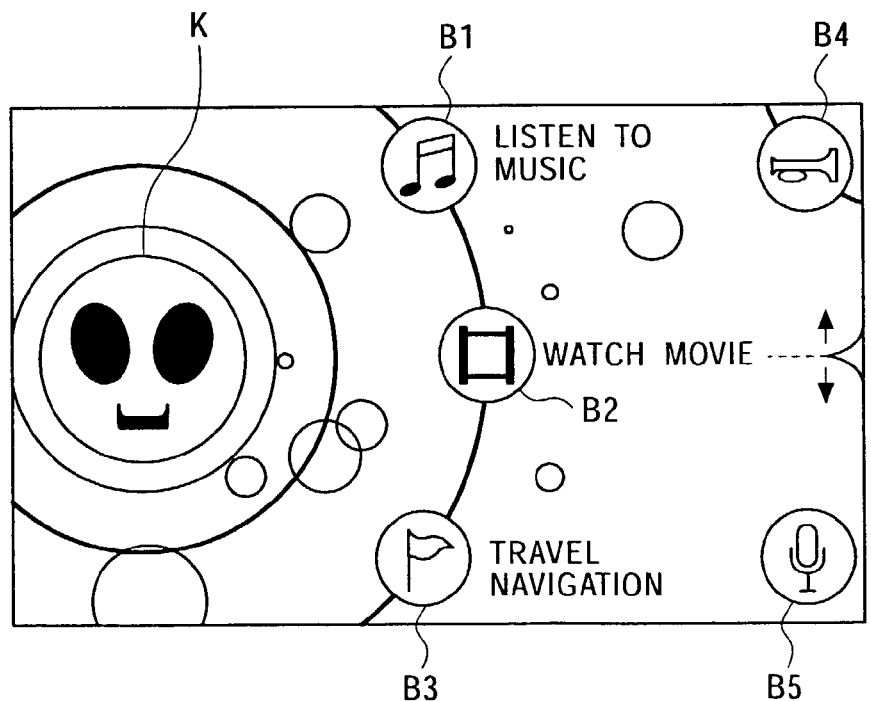
FIG. 4 is an illustration of a main menu screen.

FIG. 4 illustrates a main menu screen of the display unit 14, which is formed by a series of processes performed by the CPU 4. The main menu screen is a first display screen to be displayed on the display unit 14 at a right-hand seat. In the first embodiment, the display screen to be displayed at a left-hand seat is laterally reversed with respect to that shown in FIG. 4.

The display screen displays a character's face K expressing the vehicle's virtual emotion toward the left side of the display screen. Specifically, the display screen displays the character's face K in a circular form and a plurality of circular arcs concentric to the circle representing the character's face K. The display screen displays a plurality of icons B1 to B3 on a main circular arc of the plurality of circular arcs, the main circular arc being substantially at the center of the screen. Referring to FIG. 4, the top icon B1 of the plurality of icons B1 to B3 is for opening a music content menu and is denoted by a musical note. The icon B2 is for opening a movie content menu and is denoted by a movie film. The bottom icon B3 is for opening information content and is denoted by a flag. Outside the circular arc, the phrases "Listen to music", "Watch movie", and "Travel navigation" indicating the functions of the menus are displayed next to the icons B1 to B3.

On the side opposite the character's face K, similar icons B4 and B5 are displayed at the top and bottom of the display screen. The icon B4 at the top is for opening an operation menu for vehicle-to-vehicle communication and is denoted by a trumpet. The icon B5 at the bottom is an operation icon for activating a speech recognition function and is denoted by a microphone. Of the icons B4 and B5, the icon B4 is disposed on a circular arc that is not concentric to the main circular arc on which the icons B1 to B3 are disposed. The two arcs are not concentric, and hence they do not overlap each other.

The CPU 4 displays the icons B1 to B3 indicating selectable items on a concentric arc to allow the user to recognize that there are selectable items in a subdirectory. The icons B1 to B3 and the icon B4 are displayed on the non-concentric arcs so that the user can recognize that they are for different types of operation.

On the display screen, the background is divided into sections by the arcs. The farther away towards the outside from the character, the darker the color becomes. Circular forms, gradually increasing in size, spread toward the outside so that the user can feel as if he or she were seeing from above a scene of bubbles rising from the bottom.

Figure 5:
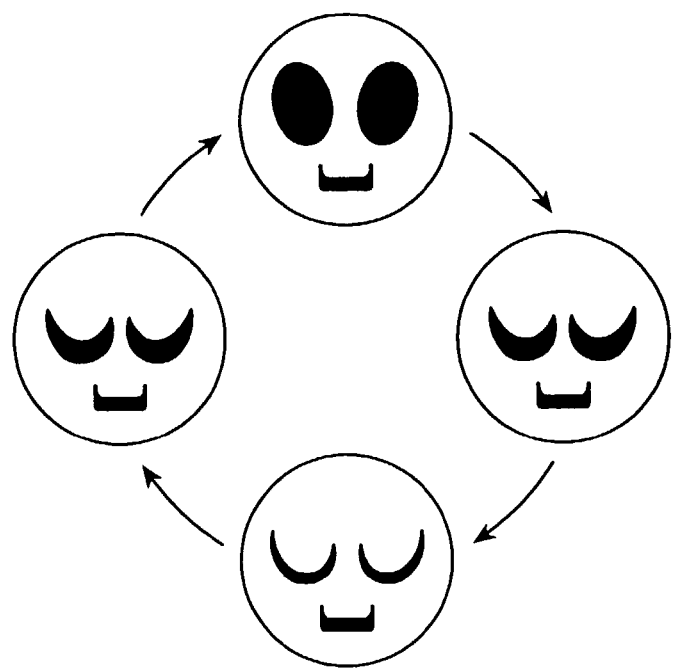
FIG. 5 is an illustration of variations in a character's facial expression representing that the character is cheerful.

The CPU 4 uses the character's face K to express the virtual emotion generated by the emotion detecting device 2 on the main menu screen formed in such a manner. The background color is changed as the character display changes. In other words, the character's face K shown in FIG. 4 represents a cheerful feeling. FIG. 5 shows changes in the character's facial expression, which are indicated by the arrows. The character's cheerful feeling is displayed using animation such as blinking the character's eyes at predetermined time intervals. When the cheerful feeling is indicated, the background color is orange, which is a warm color.

Figure 6:
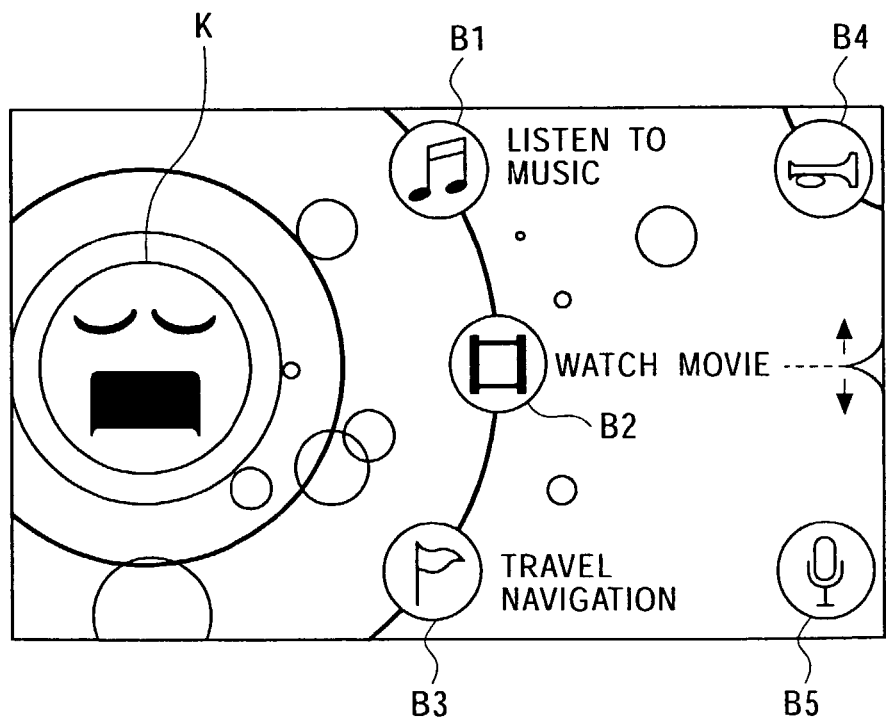
FIG. 6 is an illustration of the main menu screen displaying that the character is tired.
Figure 7:
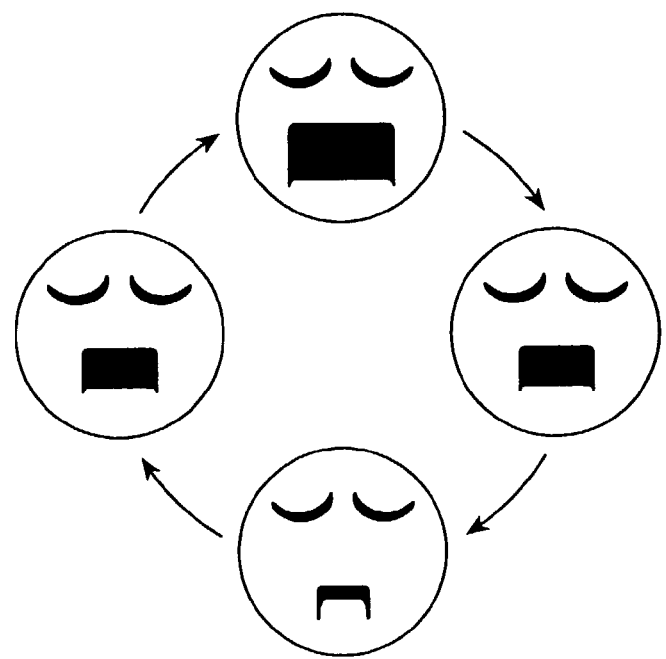
FIG. 7 is an illustration of variations in the character's facial expression representing that the character is tired.

In contrast to FIG. 4, FIG. 6 is an illustration of the character feeling tired. In this case, as shown in FIG. 7, in contrast to FIG. 5, the character is displayed using animation of the character as if the character were yawning at predetermined time intervals. When the tired feeling is displayed, the background color is orangish blue, which is a cold color.

Figure 8:
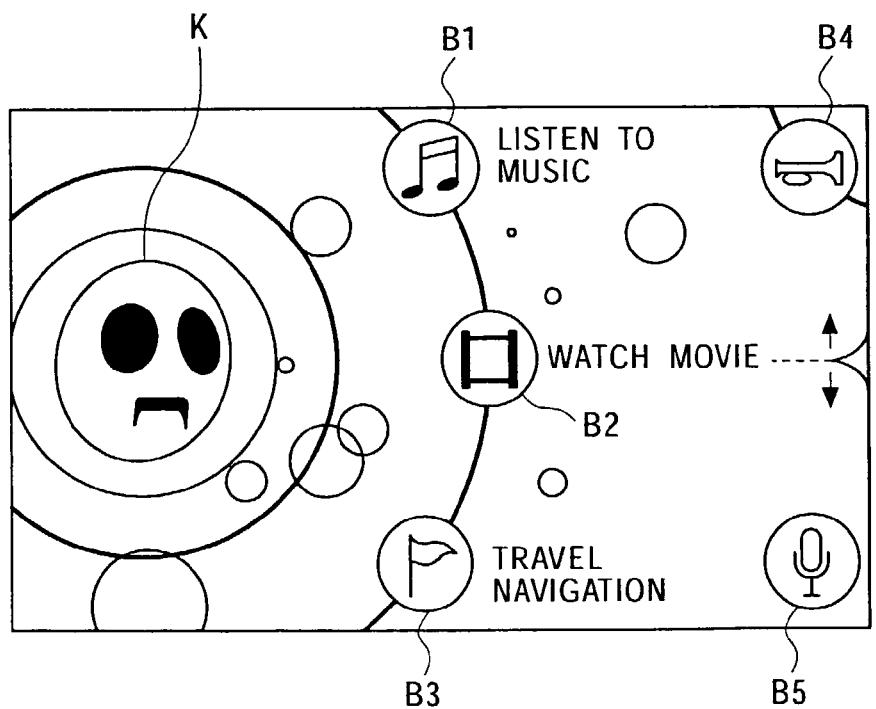
FIG. 8 is an illustration of the main menu screen displaying that the character feels lonely.
Figure 9:
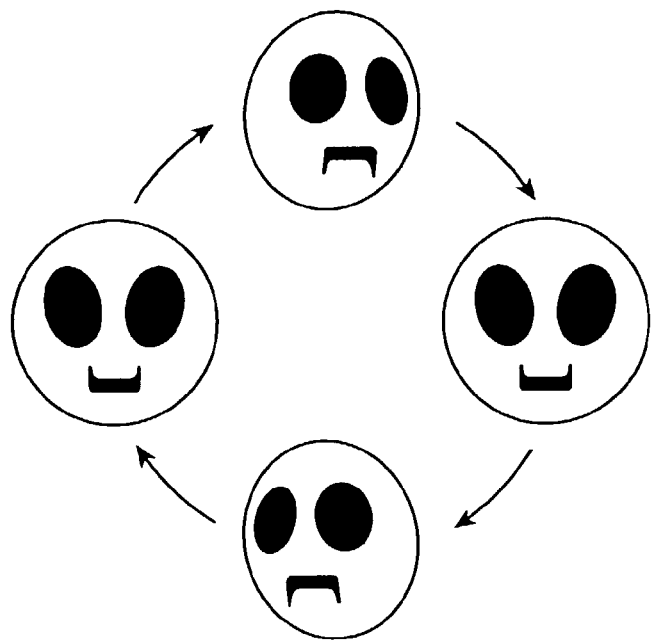
FIG. 9 is an illustration of variations in the character's facial expression representing that the character feels lonely.

In contrast to FIG. 4, FIG. 8 is an illustration of the character feeling lonely. In this case, as shown in FIG. 9, in contrast to FIG. 5, the character is displayed using animation of the character as if the character were looking around restlessly at predetermined time intervals. When the lonely feeling is displayed, the background color is blue.

Figure 10:
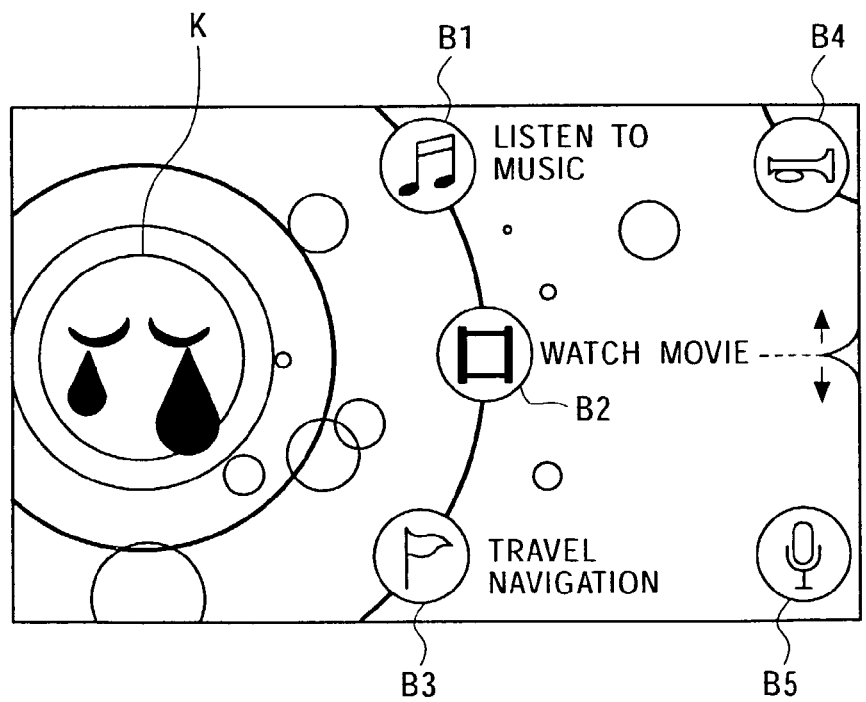
FIG. 10 is an illustration of the main menu screen displaying that the character is sad.
Figure 11:
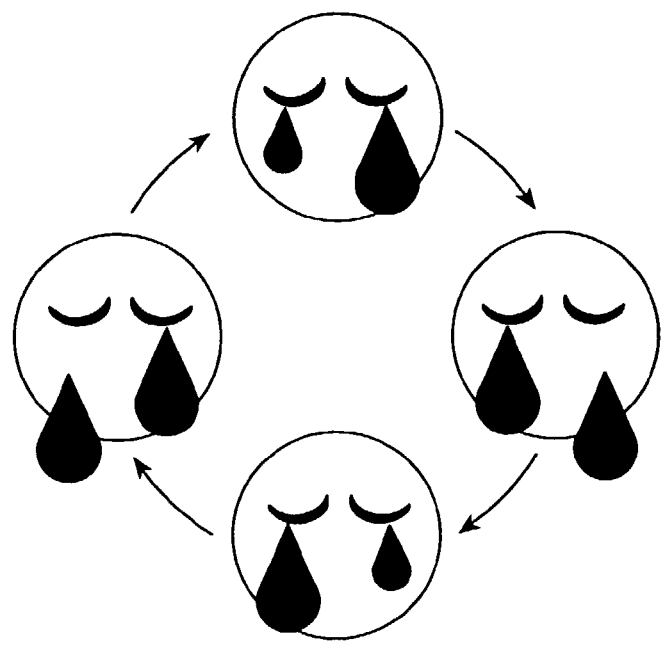
FIG. 11 is an illustration of variations in the character's facial expression representing that the character is sad.

In contrast to FIG. 4, FIG. 10 is an illustration of the character feeling sad. In this case, as shown in FIG. 11, in contrast to FIG. 5, the character is displayed using animation of the character crying. When the sad feeing is displayed, the background color is blue, which is a cold color.

Figure 12:
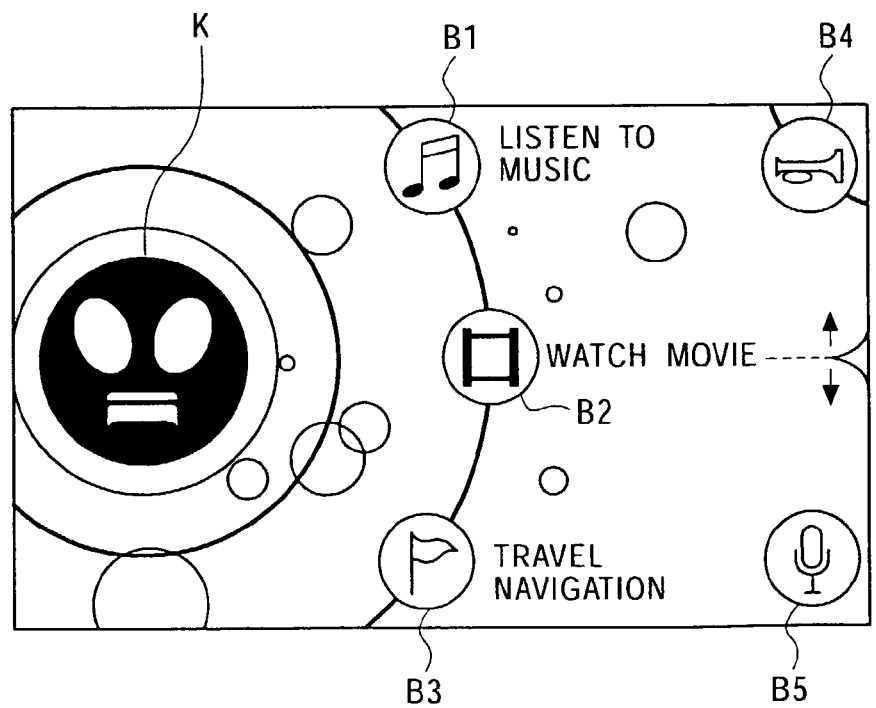
FIG. 12 is an illustration of the main menu screen displaying that the character is angry.
Figure 13:
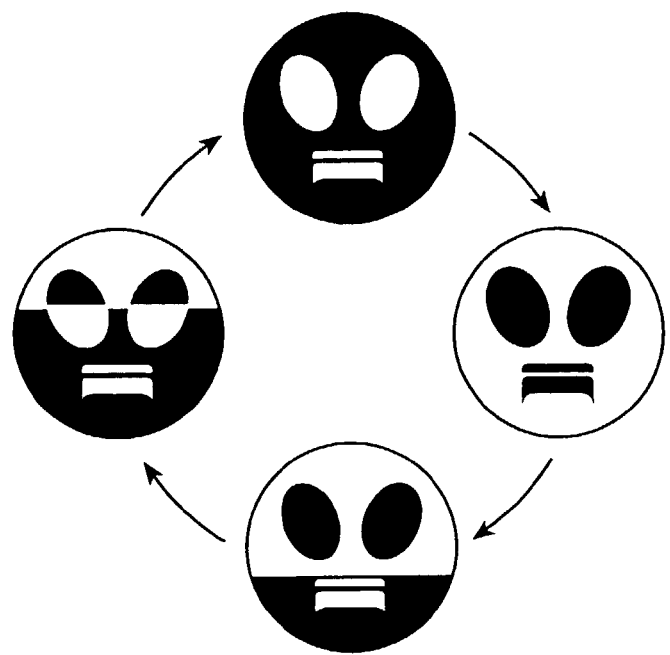
FIG. 13 is an illustration of variations in the character's facial expression representing that the character is angry.

In contrast to FIG. 4, FIG. 12 is an illustration of the character feeling angry. In this case, as shown in FIG. 13, in contrast to FIG. 5, the character is displayed using character animation in which a portion of the face in a different color gradually spreads from below toward the top. When the angry feeling is displayed, the background color is red, which is a color indicating fury.

Figure 14:
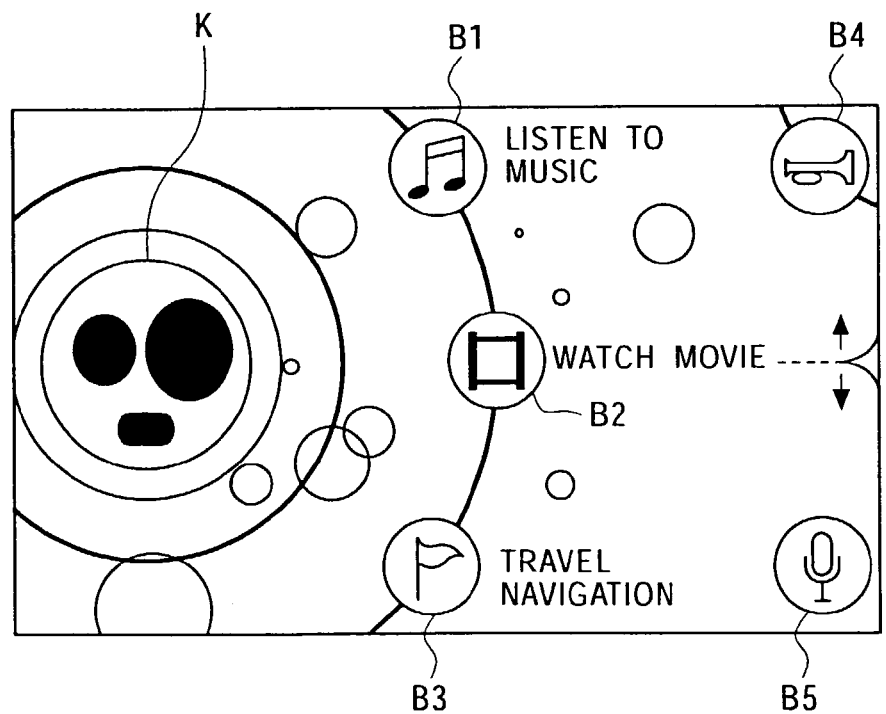
FIG. 14 is an illustration of the main menu screen displaying that the character is surprised.
Figure 15:
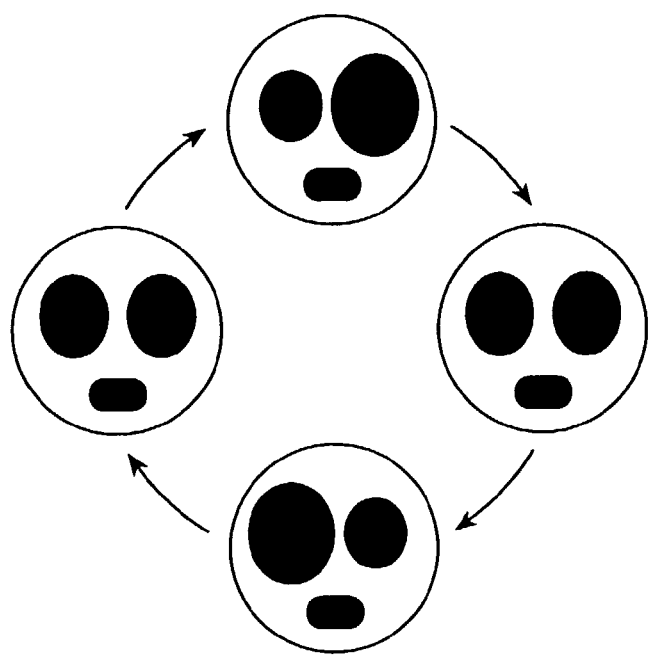
FIG. 15 is an illustration of variations in the character's facial expression representing that the character is surprised.

In contrast, FIG. 14 illustrates that the character is surprised. In this case, as shown in FIG. 15, the character is displayed using character animation in which the mouth is partially open while alternately widening the eyes. When the surprised feeling is displayed, the background color remains unchanged from the previous state, such as the color of sadness or cheer.

Figure 16:
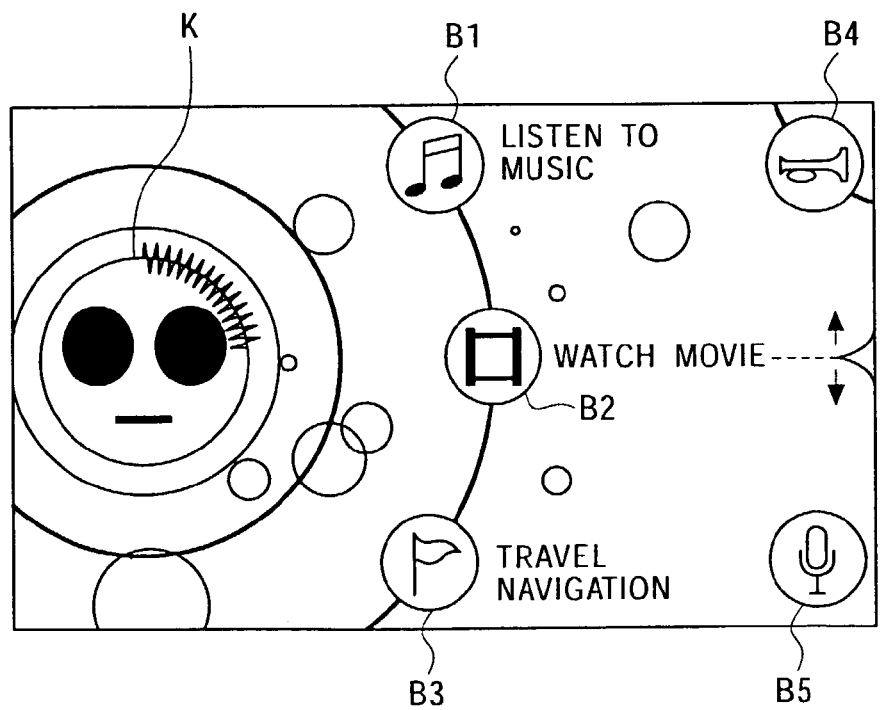
FIG. 16 is an illustration of the main menu screen displaying that the character is fearful.
Figure 17:
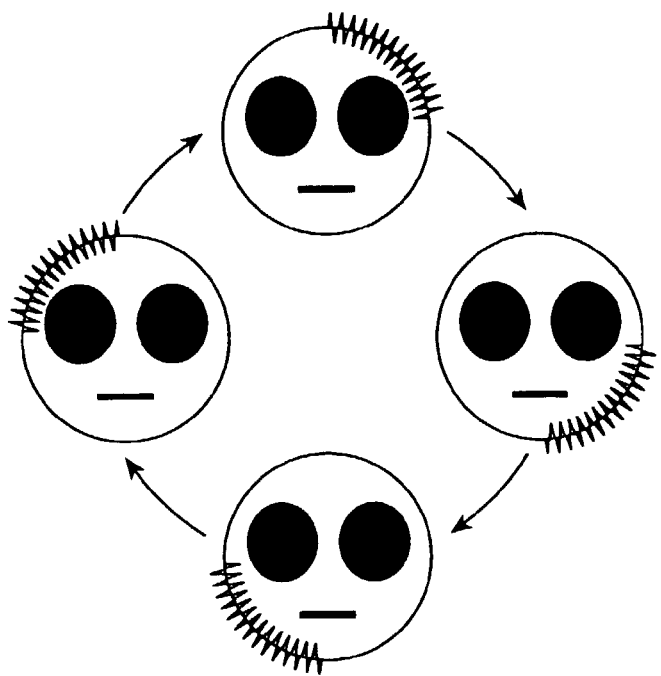
FIG. 17 is an illustration of variations in the character's facial expression representing that the character is fearful.

In contrast, FIG. 16 is an illustration of the character feeling fearful. In this case, as shown in FIG. 17, the character is displayed using animation in which the character's contour is partially fuzzy, the fuzzy portion moving from one position to another on the contour. When the fearful feeling is displayed, the background color remains unchanged from the previous state, such as the color of sadness or cheer.

Figure 18:
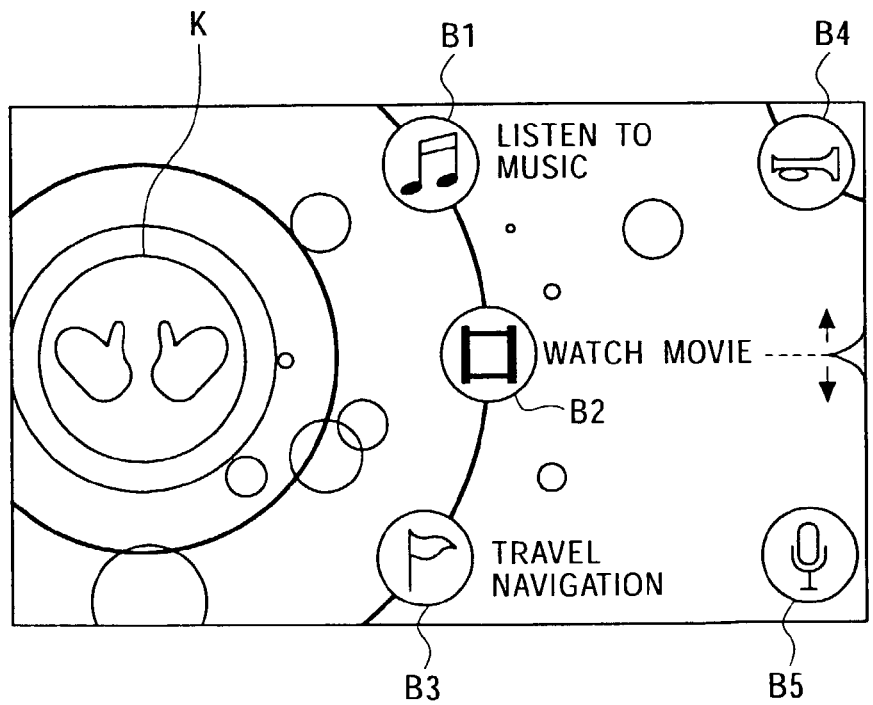
FIG. 18 is an illustration of the character praising user's driving.

In contrast, FIG. 18 illustrates the character praising the user's driving. In this case, instead of the character's face K, the character's hands are displayed, and clapping hands animation is displayed. In this case, the background color is set to orange, which is the same as that in the cheerful state.

In contrast, when one of the icons B1 to B3 is selected, the CPU 4 displays a sub-menu screen corresponding to the selected icon. The sub-menu screen is a second display screen and displays icons of available content corresponding to the icon selected by the user.

Figure 19:
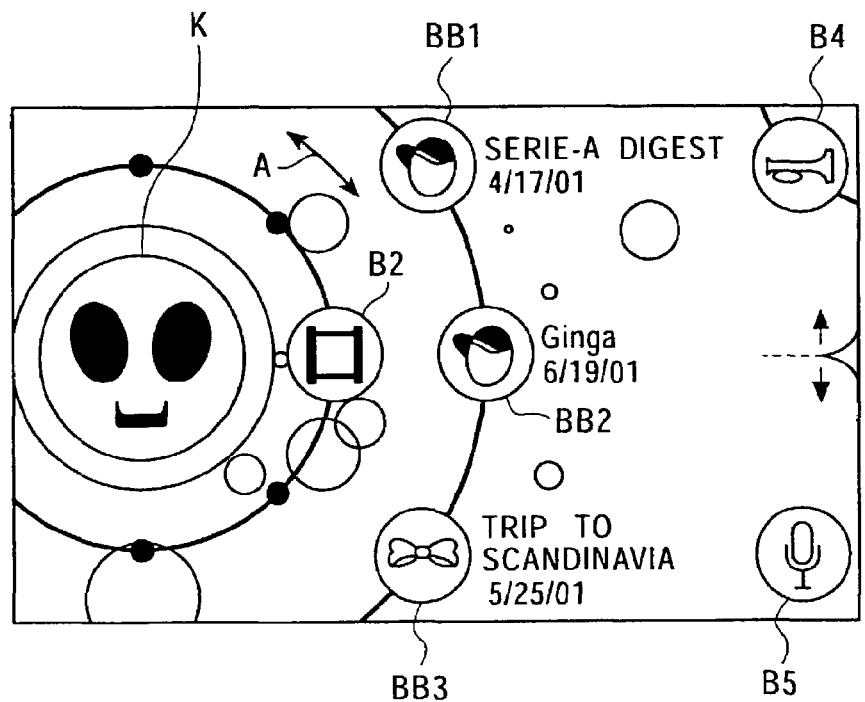
FIG. 19 is an illustration of a sub-menu screen displaying movie content.

Specifically, FIG. 19 is an illustration of the sub-menu screen when the icon B2 to open the movie content menu is selected on the main menu screen shown in FIG. 4. When the icon B2 is selected on the main menu screen shown in FIG. 4, the CPU 4 moves the icon B2 so that it is displayed at a position on an inner sub circular arc. In accordance with the movement of the icon B2, traces of the other icons B1 and B3 are displayed on the sub circular arc using small circles.

At the positions where the icons B1 to B3 used to be displayed, icons BB1 to BB3 to open movie content titles are displayed. The icons BB1 to BB3 are indicated with symbols of passengers who are fond of the corresponding content. Next to these, details of the content are displayed as text, and the stored date (on which the content was stored in the in-vehicle apparatus 1) is also displayed. Referring to FIG. 19, a face with a cap, which conjures up the image of a boy, is allocated to the symbols of the icons BB1 and BB2, and a ribbon, which conjures up the image of a girl, is allocated to the symbol of the icon BB3.

As the user scrolls through the screen, the CPU 4 moves the icons BB1 to BB3 on the circular arc, as indicated by the arrow A, and displays other subsequent icons of available content. Accordingly, the CPU 4 allows the content to be selected by the icons BB1 to BB3.

When the content selecting screen is displayed, the CPU 4 represents joy, anger, sadness, or pleasure based on the vehicle's virtual emotions in a manner similar to that when the main menu screen is displayed. On the sub-menu screen, when the icon B2, which is now displayed on the inner circular arc, is selected, the CPU 4 changes the display from the display screen shown in FIG. 19 back to the main menu screen shown in FIG. 4.

When the CPU 4 changes the display from the main menu screen to the sub-menu screen, the icons B1 to B3 leave partial traces thereof and move to the sub circular arc, and the icons BB1 to BB3 appear from outside the display screen and move to the main circular arc. Such animation is used to change the display. In contrast, animation of the icons moving toward the outside of the display screen is displayed when changing the display from the sub-menu screen to the main menu screen.

Figure 20:
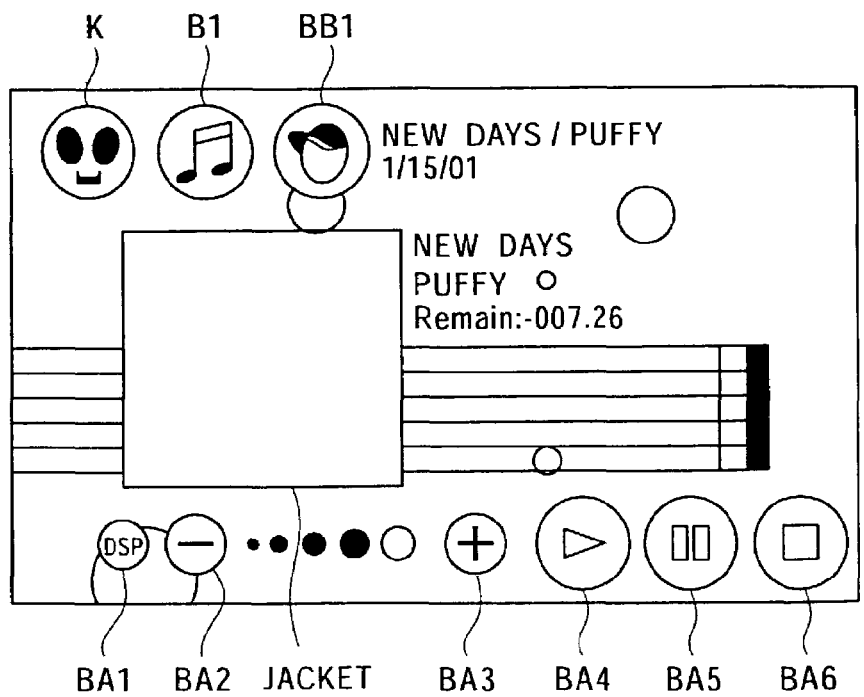
FIG. 20 is an illustration of a playback screen for music content.

In contrast, when one of the icons BB1 to BB3 of the content is selected, the CPU 4 starts playing the corresponding content. When the user selects the music content, as shown in FIG. 20, the CPU 4 displays, starting from the upper left corner of the display screen, the character K expressing the emotion/feeling, the selected icon B1 of the music content, and the selected icon BB1 of the content selected by the user. Also, the CPU 4 displays details of the selected content and the stored date of the content (the date on which the content was stored in the in-vehicle apparatus 1). Accordingly, the CPU 4 allows the user to easily recognize the song currently playing. When the icon B1 or the icon BB1 is selected, the content playback is stopped, and, as shown in FIGS. 4 and 19, the display is changed to the higher-level display screen corresponding to the icon B1 or the icon BB1.

At the center of the display screen shown in FIG. 20, the jacket of the content is displayed and the background displays music paper. The CPU 4 can allow the user to recognize the song currently playing by displaying the music paper and the jacket.

At the bottom of the display screen, the display screen displays an icon BA1 for turning on/off a digital signal processor (DSP), icons BA2 and BA3 for controlling the volume, an icon BA4 (play) for starting a movie or music, an icon BA5 (pause) for pausing a movie or music, and an icon BA6 (stop) for stopping a movie or music. The CPU 4 changes the processing for the content in response to the selection of the-icons BA1 to BA6. Between the volume control icons BA2 and BA3, the current volume is indicated by a series of circles. Accordingly, the CPU 4 is designed to detect the vehicle's virtual emotion representing joy, anger, sadness, or pleasure while displaying the music content currently being playing.

Figure 21:
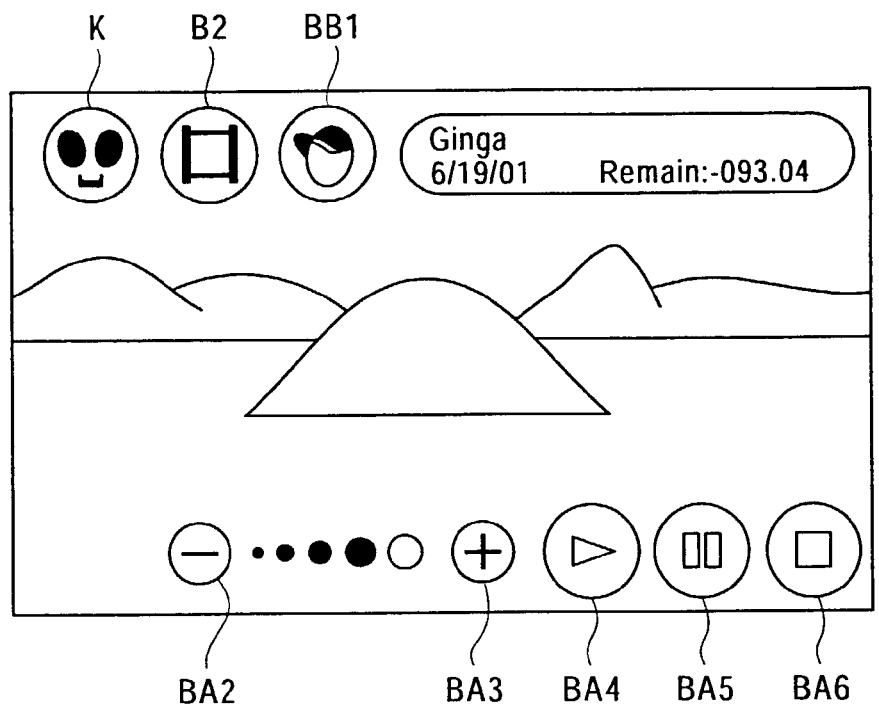
FIG. 21 is an illustration of a playback screen for movie content.

FIG. 21 illustrates the display screen when the movie content is selected. In this case, the display screen displays, instead of the background displayed when the music content is played, as shown in FIG. 20, a video image of the movie content; the icon BA1 for turning on/off the DSP is omitted; and the content title and the remaining time are displayed. Other than these points, the display screen is formed similarly to that for the music content. In the in-vehicle apparatus 1, both the music content and the movie content can be played back by similar operations.

Figure 22:
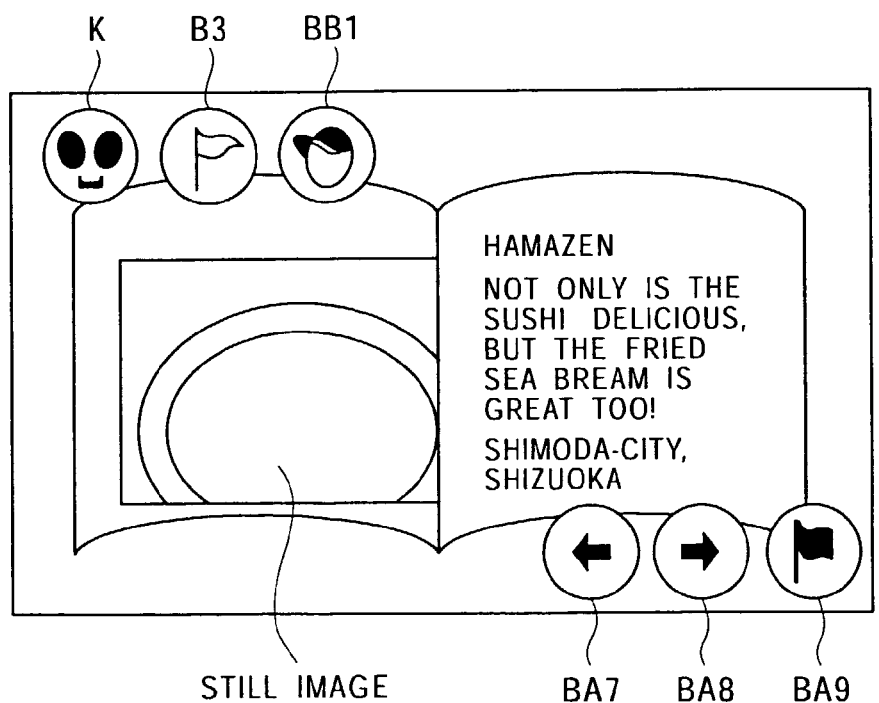
FIG. 22 is an illustration of a display screen for displaying information content.

FIG. 22 illustrates the display screen when the icon B3 to open the information content is selected. In this case, the information content includes a still image. The CPU 4 causes the display screen to display, starting from the upper left corner thereof, the character K expressing the emotion/feeling, the selected icon B3 of the information content, and the selected icon BB1 of the content selected by the user. Also, details of the selected content and the stored date of the content (the date on which the content was stored in the in-vehicle apparatus 1) are displayed. When the icon B3 or the icon BB1 is selected, the content display is terminated, and the display is changed to the higher-level main menu screen or the sub-menu screen corresponding to the icon B3 or the icon BB1.

At the center of the display screen shown in FIG. 22, details of the information contained in the content are displayed and the background displays pages of an open book. The CPU 4 can allow the user to recognize the content currently being playing by displaying this background.

In the lower left corner of the display screen, the display screen displays page turning icons BA7 and BA8 and an icon BA9 for linking to the site of a store indicated by the displayed information. The CPU 4 changes the processing for the content and the overall operation in response to the selection of the icons BA7 to BA9.

FIG. 1 is a flowchart showing a process performed by the CPU 4, starting from a state in which the main menu screen is displayed to playing the movie content. When the main menu screen shown in FIG. 4 is displayed, the CPU 4 proceeds from step S1 to step S2. In step S2, it is determined whether or not the icon B2, i.e., the movie icon, is selected. If the determination is negative, the processing in step S2 is repeated.

In contrast, if the icon B2 is selected, in step S3, the CPU 4 detects various sources connected to the source selector 10. In step S4, the CPU 4 creates a list of available movie content titles to be presented to the user. In step S5, the CPU 4 moves the icon B2, which is disposed on the main circular arc, to the inner sub circular arc. At the same time, the CPU 4 displays traces of the remaining icons B1 and B3.

In step S6, the CPU 4 iconizes the available movie content titles to be presented to the user in accordance with the list and displays the icons on the main circular arc. As shown in FIG. 19, the CPU 4 displays the sub-menu screen. In step S7, it is determined whether or not one of the icons BB1 to BB3 of the movie content titles is selected.

If the determination is negative, the CPU 4 repeats the processing in step S7. If the determination in step S7 is affirmative, in step S8, the CPU 4 starts playing the movie content. Accordingly, the CPU 4 stops displaying the sub-menu screen and displays the movie content (FIG. 21). Alternatively, the CPU 4 provides the sound for the movie content to the user. In step S9, the process is terminated.

1-2 Operation of First Embodiment

In the in-vehicle apparatus 1 with the foregoing arrangement, which is shown in FIG. 2, the display unit 14 displays the main menu screen shown in FIG. 4 under the control of the display processing circuit 13 by the CPU 4. In the in-vehicle apparatus 1, the main menu screen displays the icons B1 to B3, each indicating a selectable item. By selecting one of the icons B1 to B3, the main menu screen is changed to the corresponding sub-menu screen shown in FIG. 19.

On the main menu screen, selectable items are assigned content types. The icons B1 to B3 indicating the content types are displayed on the main circular arc at the center of the main menu screen. In the in-vehicle apparatus 1, when the main menu screen is changed to the sub-menu screen, the selected icon is moved from the main circular arc to the sub concentric arc disposed inside the main circular arc, and the selected icon is displayed on the sub circular arc. At the same time, the icons BB1 to BB3 to be selected appear from the outside, and the icons BB1 to BB3 are moved to the main circular arc and displayed.

On the sub-menu screen, when the original icon B1 disposed on the sub circular arc is selected, the sub-menu screen is changed to the main menu screen while the icons are moved in the reverse direction to the direction when the main menu screen is changed to the sub-menu screen.

Accordingly, the user can determine the operation he or she performed without thinking about it. Thus, the usability is improved, and the user can easily and reliably search for the desired content. In other words, when the user selects movie content, the movie content icon moves inward, and selectable icons of movie content titles appear from the outside and are displayed outside the movie content icon. In this way, the selectable content titles are narrowed down, and the user can see the operation required to select the desired content.

On the sub-menu screen, only the selected icon is displayed on the sub circular arc, and the other unselected icons are displayed as traces in small circular forms. With the sub-menu screen thus being displayed, the user can see that there are other selectable items on the original menu screen. When the icon displayed on the sub circular arc is selected to return to the original menu screen, the icon is moved and displayed. Thus, the user can see that the object to be selected has changed without thinking about it. According to the first embodiment, the usability is improved, and the user can easily and reliably select the desired content.

In particular, when both the main menu screen and the sub-menu screen are displayed, the concentric main and sub circular arcs are displayed. By moving the icons, the user can recognize that the object to be selected is changed without thinking about it. Thus, the user can easily confirm the operation he or she performed.

The main and sub circular arcs are displayed at positions offset from the center. This gives a sufficient display area, and hence various selectable items can be displayed. By disposing icons belonging to the same hierarchy on each circular arc, the user can grasp the hierarchical structure of selectable items corresponding to the icons.

In the in-vehicle apparatus 1, when one of the specific content selectable icons BB1 to BB3 is selected on the sub-menu screen, the corresponding content is played and presented to the user. On the display screen, the sub-menu screen is changed to a video image of the content shown in FIG. 21 or FIG. 22 or details of the content shown in FIG. 21. In the in-vehicle apparatus 1, the selected icons B1 to B3 and BB1 are displayed side-by-side in the corner of the screen. Thus, the user can receive information on the current content being played or shown on the screen, the hierarchical structure, and the operation log. Accordingly, the usability can be improved.

When one of the icons B1 to B3 and BB1 disposed in the corner of the screen is selected, the screen is changed to the corresponding main menu screen or the sub-menu screen. In the in-vehicle apparatus 1, the user can return to the original screen if necessary and reselect content.

In particular, in this case, the user can skip the sub-menu screen and directly move to the main menu screen without repeating the operation. Thus, the usability can be improved.

In the in-vehicle apparatus 1, available content to be presented in such a manner is detected at a predetermined time, the content is classified according to type, and each content type is allocated to the corresponding sub-menu screen. Thus, the user can select the desired content without being aware of where (in which drive) the desired content resides. Thus, the user can easily and reliably find the desired content.

In the in-vehicle apparatus 1, available content (presentable content) is classified into music content, movie content, and information content on the basis of human actions such as "seeing", "listening", and "reading". Thus, the user can easily and reliably select the desired content.

In the in-vehicle apparatus 1, virtual emotions are generated, as if the vehicle had a personality, on the basis of the user's vehicle handling. If the user handles the vehicle violently, a sad feeling or an angry feeling is generated. If the user handles the vehicle carefully and drives the vehicle smoothly, a cheerful feeling is generated. In the in-vehicle apparatus 1, the character's facial expression is generated from the feeling detected in such a manner, and the character's facial expression is displayed at the center of the main and sub circular arcs on the main menu screen and the sub-menu screen. When content is being played, the character's facial expression is similarly displayed together with the icons.

Accordingly, in the in-vehicle apparatus 1, the user can be appropriately informed of the vehicle state without disturbing the driver. Thus, the user can look back on the driving from the vehicle's point of view, and accidents can be avoided. With the in-vehicle apparatus 1, safe-driving, an improvement in driving technique, and an appreciation of the user's vehicle can be promoted.

1-3 Advantages of First Embodiment

With the foregoing arrangement, the display is switched between a main menu screen on which a plurality of icons, each indicating a selectable item, are sequentially disposed on a main circular arc and a sub-menu screen on which the icon selected by the user is moved and displayed and a plurality of icons, each indicating a corresponding selectable item, are displayed on the main circular arc. It thus allows a user to easily and reliably select the desired content.

By switching between the main menu screen, which is a first display screen, and the sub-menu screen, which is a second display screen, while animating the display showing icon movement in between the change of screens, the user can recognize the change of hierarchy without thinking about it. Thus, the user can easily and reliably select the desired content.

Since the icon on the second display screen is displayed on the sub circular arc, which is substantially concentric to the main circular arc, the icons being displayed on the concentric circular arcs allow the user to recognize the hierarchical relationship without thinking about it. Thus, the user can easily and reliably select the desired content.

By displaying traces of the other icons on the sub circular arc, the user can recognize the hierarchical structure without thinking about it.

Since the center of the main circular arc is at a position offset from the center of the display screen by a predetermined distance, a sufficient display area can be achieved, and content types and content titles can be displayed as text. Thus, the user can easily and reliably detect the desired content.

By combining content in different directories, classifying the combined content according to type, and assigning each content type to the corresponding main menu screen and the sub-menu screen in accordance with the classification, the user can select the desired content without being aware of where the content resides. Thus, the operationality can be improved.

Because the classification is based on the user's actions, the usability can be further improved.

With the content being played, the icons of the main menu screen and the sub-menu screen leading to the content being played are displayed in the corner of the screen. Thus, the user can play the content and see the operation log and the hierarchical structure. This contributes to an improvement in the usability.

By selecting one of the icons of the main menu screen and the sub-menu screen displayed in the corner of the screen, the screen is changed to the main menu screen or the sub-menu screen. The screen can skip a plurality of intermediate hierarchy levels by one action and return to the corresponding screen, and hence the usability can be improved.

The user's vehicle handling is detected, and the vehicle's virtual emotions are generated. The virtual emotions are represented by a predetermined character's facial expression displayed at the center of the main circular arc. Thus, the user can be appropriately informed of the vehicle state.

In conjunction with the foregoing operation, the background color of the display screen is changed to allow the user to recognize the vehicle state without thinking about it.

Since the character is displayed using an animation, the user can feel friendship for the character.

2 Other Embodiments

In the first embodiment, a case in which icons appear from the outside of a display screen and are moved to a main circular arc when a main menu screen is changed to a sub-menu screen has been described. However, the present invention is not limited to this case. For example, the main menu screen can be changed to the sub-menu screen by inserting various types of animation between the two screens. For example, a small point appears on the main circular arc, and this point gradually increases in size and becomes an icon to be displayed on the main circular arc.

In the first embodiment, a case in which icons are moved inward when the main menu screen is changed to the sub-menu screen has been described. In this case, the more outer circular arc indicates the deeper hierarchical level. However, the present invention is not limited to this case.

For example, the direction in which the icons are moved can be reversed. In this way, the more inner circular arc indicates the deeper hierarchical level.

In the first embodiment, a case in which the icons are displayed on the arcs using two hierarchical levels has been described. However, the present invention is not limited to this case. For example, the present invention is broadly applicable to cases in which the menus at three or more hierarchical levels are changed from one menu to another. In such cases, more numerous circular arcs can be displayed so as to correspond to the three or more hierarchical levels.

In the first embodiment, the present invention is applied to content selection, in which a case where content and content type can be selected by icons has been described. However, the present invention is not limited to this case. The present invention is broadly applicable to various types of search and to operations of various types of apparatuses. More specifically, the present invention can be applied to, for example, phone number search, map search, and postal code search in which a phone number, map, and postal code can be detected using a hierarchy of address levels, such as a house number, street name, city, and state.

In the first embodiment, a case in which the character expressing emotions/feelings is displayed independent of content selection has been described. However, the present invention is not limited to this case. For example, the present invention is applicable to a case in which the character is changed in accordance with the selected content type or the specific content. In this case, for example, when music content, namely, classical music content, is selected, the character to be displayed is changed to a conductor, and the virtual emotions can be expressed by the conductor's actions. If necessary, character images can be downloaded so that the user can change to a preferred character.

In the first embodiment, a case in which content selection by the user is accepted irrespective of the virtual emotions and the selected content is presented to the user has been described. However, the present invention is not limited to this case. Alternatively, the functions can be restricted by both sides. In other words, for example, when the vehicle is driven very violently, only soft music is allowed to be played.

Figure 23:
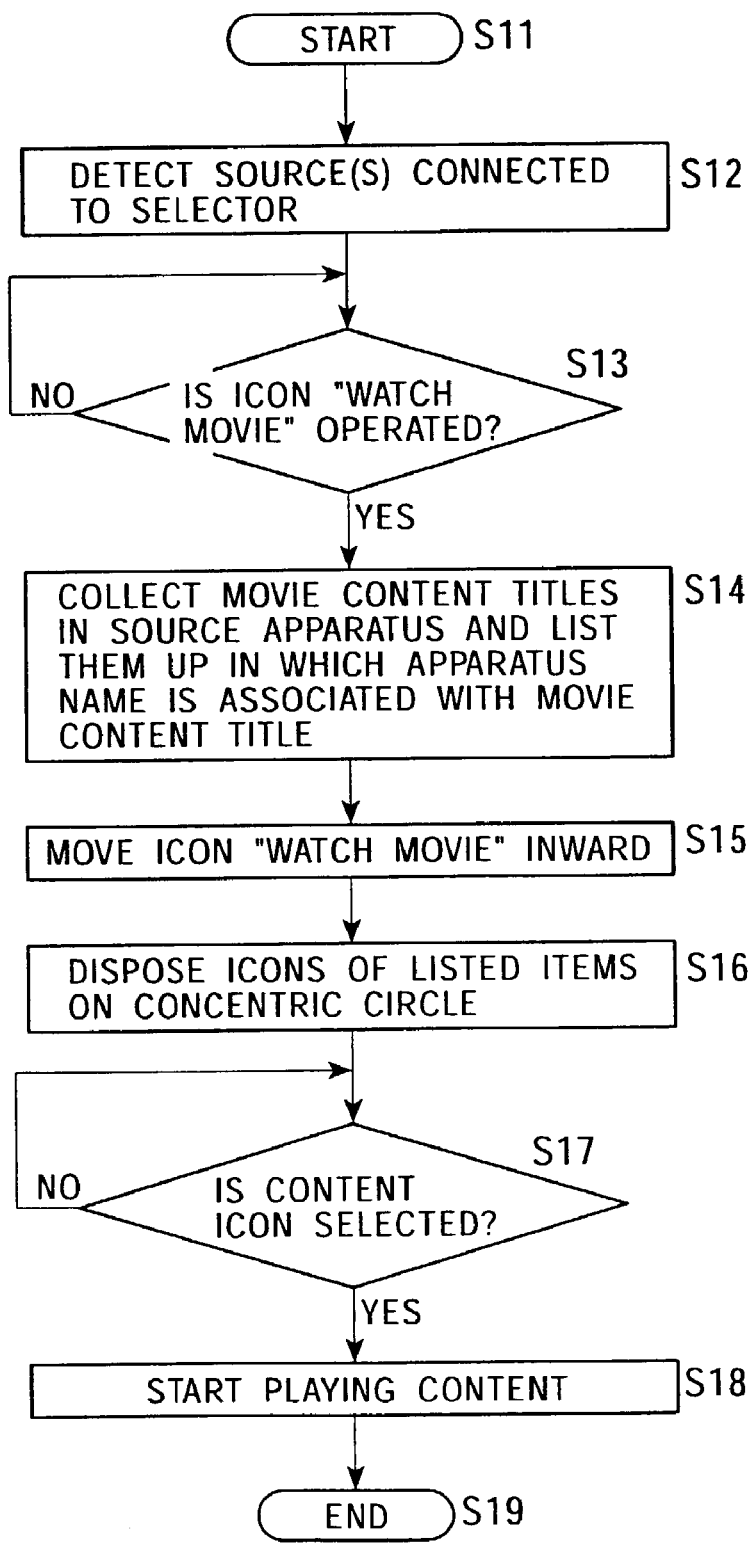
FIG. 23 is a flowchart showing a process according to another embodiment of the present invention.
Figure 24A:
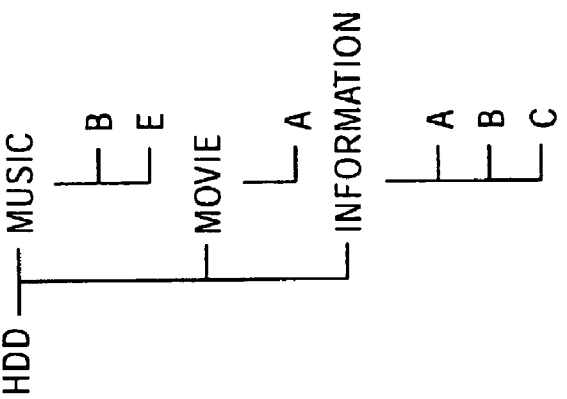
FIG. 24A illustrates a directory structure for a CD.
Figure 24B:
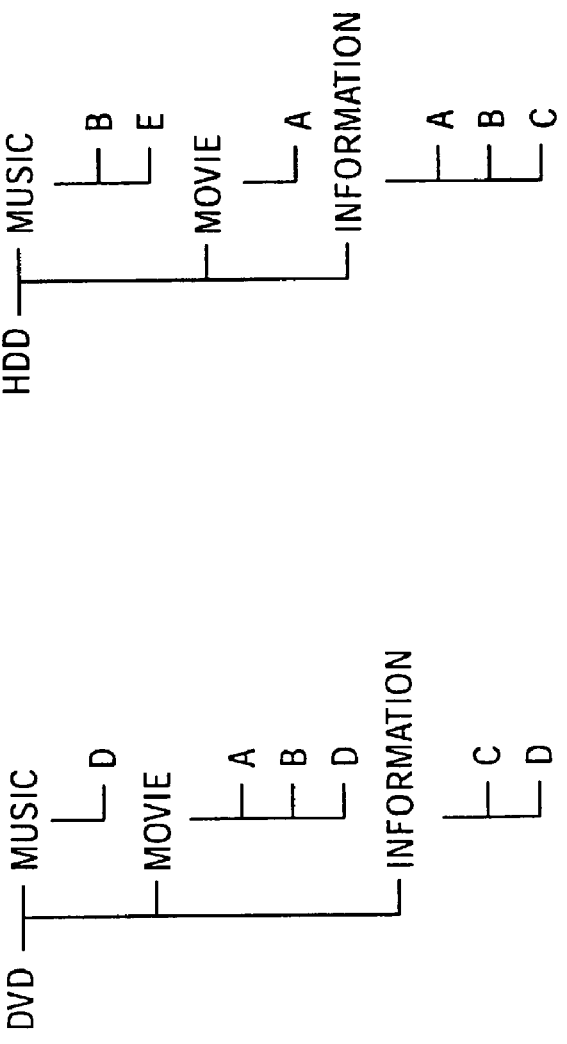
FIG. 24B illustrates a directory structure for a DVD.
Figure 24C:
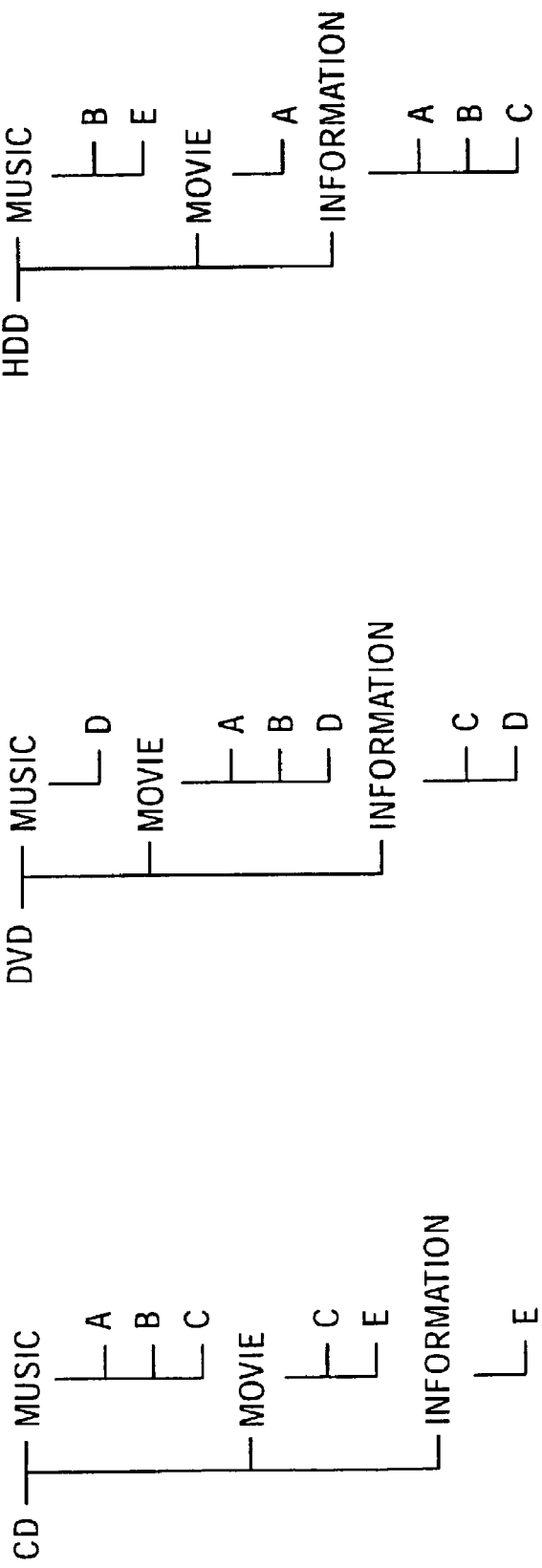
FIG. 24C illustrates a directory structure for an HDD.

In the first embodiment, a case in which available content is detected when an icon is selected by the user has been described. However, the present invention is not limited to this case. As shown in FIG. 23, in contrast to FIG. 1, available content can be detected in advance. Accordingly, the content selecting operation can be performed more quickly.

In the first embodiment, a case in which the present invention is applied to an in-vehicle apparatus has been described. However, the present invention is not limited to this case. The present invention is broadly applicable to cases in which the present invention is applied to various types of apparatuses for displaying menus.

What is claimed is:

1. A menu display apparatus comprising:
   a first display screen on which a plurality of first icons, each representing a selectable item, are sequentially disposed on a main circular arc; and
   a second display screen on which, of the plurality of first icons, the first icon selected by a user is moved toward the center of the main circular arc or outside the main circular arc and is displayed and a plurality of second icons, each representing a selectable item belonging to the selected first icon, are displayed on the main circular arc, wherein the first display screen and the second display screen are selectively displayed, when the first icon on the first display screen is selected, the display is changed from the first display screen to the second display screen, and when the first icon on the second display screen is selected, the display is changed from the second display screen to the first display screen, further comprising virtual emotion generating means for detecting the user's handling of a vehicle and generating virtual emotions on an assumption that the vehicle had a personality, wherein the virtual emotions are displayed at the center of the main circular arc by a predetermined character.

2. A menu display apparatus according to claim 1, wherein the change of screen between the first display screen and the second display screen is performed by inserting animated movement of the plurality of first and second icons.

3. A menu display apparatus according to claim 1, wherein a position at which the selected first icon is displayed on the second display screen is on a sub circular arc, which is substantially concentric to the main circular arc.

4. A menu display apparatus according to claim 3, wherein traces of the other first icons, except for the selected first icon, are displayed on the sub circular arc.

5. A menu display apparatus according to claim 1, wherein the center of the main circular arc is offset from the center of the display screen by a predetermined distance.

6. A menu display apparatus according to claim 1, wherein content in different directories is combined, and the combined content is classified according to type,
the items selectable by the plurality of first icons are the classified content types, and
the items selectable by the plurality of second icons are content titles classified by the classification.

7. A menu display apparatus according to claim 6, wherein the classification is based on the user's actions.

8. A menu display apparatus according to claim 1, wherein the items selectable by the plurality of second icons are content titles,
a playback screen for playing the corresponding content title is displayed when one icon is selected from the plurality of second icons displayed on the second display screen, and
the plurality of first and second icons leading to the content being played are displayed in a portion of the playback screen.

9. A menu display apparatus according to claim 8, wherein, when one icon is selected from the plurality of first icons displayed on the playback screen, the display is changed to the first display screen, and
when one icon is selected from the plurality of second icons displayed on the playback screen, the display is changed to the second display screen.

10. A menu display apparatus according to claim 1, wherein the color of a background of the first or the second display screen is changed in conjunction with the virtual emotions.

11. A menu display apparatus according to claim 1, wherein the character is displayed using animation.

12. A menu display method comprising the steps of:
selectively displaying a first display screen and a second display screen, the first display screen on which a plurality of first icons, each representing a selectable item, being sequentially disposed on a main circular arc, and the second display screen on which, of the plurality of first icons, the first icon selected by a user being moved toward the center of the main circular arc or outside the main circular arc and being displayed and a plurality of second icons, each representing a selectable item belonging to the selected first icon, being displayed on the main circular arc;

changing the display from the first display screen to the second display screen when the first icon on the first display screen is selected;

changing the display from the second display screen to the first display screen when the first icon on the second display screen is selected; and detecting the user's handling of a vehicle and generating virtual emotions on the assumption that the vehicle had a personality, wherein the virtual emotions are displayed at the center of the main circular arc by a predetermined character.

13. A menu display method according to claim 12, wherein the change of screen between the first display screen and the second display screen is performed by inserting animated movement of the plurality of first and second icons.

14. A menu display method according to claim 12, wherein a position at which the selected first icon is displayed on the second display screen is on a sub circular arc, which is substantially concentric to the main circular arc.

15. A menu display method according to claim 14, wherein traces of the other first icons, except for the selected first icon, are displayed on the sub circular arc.

16. A menu display method according to claim 12, wherein the center of the main circular arc is offset from the center of the display screen by a predetermined distance.

17. A menu display method according to claim 12, wherein content in different directories is combined, and the combined content is classified according to type,
the items selectable by the plurality of first icons are the classified content types, and
the items selectable by the plurality of second icons are content titles classified by the classification.

18. A menu display method according to claim 12, wherein the items selectable by the plurality of second icons are content titles,
a playback screen for playing the corresponding content title is displayed when one icon is selected from the plurality of second icons displayed on the second display screen, and
the plurality of first and second icons leading to the content being played are displayed in a portion of the playback screen.

19. A menu display method according to claim 18, wherein, when one icon is selected from the plurality of first icons displayed on the playback screen, the display is changed to the first display screen, and
when one icon is selected from the plurality of second icons displayed on the playback screen, the display is changed to the second display screen.

* * * * *